(12) United States Patent
Nakanishi

(10) Patent No.: US 9,384,524 B2
(45) Date of Patent: Jul. 5, 2016

(54) IMAGE PROCESSING APPARATUS AND IMAGE DISPLAY SYSTEM

(71) Applicant: KABUSHIKI KAISHA TOSHIBA, Minato-ku, Tokyo (JP)

(72) Inventor: Keiri Nakanishi, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 331 days.

(21) Appl. No.: 13/971,733

(22) Filed: Aug. 20, 2013

(65) Prior Publication Data

US 2014/0285505 A1    Sep. 25, 2014

(30) Foreign Application Priority Data

Mar. 25, 2013    (JP) ................................ 2013-061510

(51) Int. Cl.
  *G06T 1/20*    (2006.01)
  *H04N 19/40*   (2014.01)

(52) U.S. Cl.
  CPC . *G06T 1/20* (2013.01); *H04N 19/40* (2014.11)

(58) Field of Classification Search
  CPC ... H04N 19/40; H04N 19/436; H04N 19/423; H04N 19/42; H04N 19/44; H04N 1/32149; H04N 21/4385
  See application file for complete search history.

(56) References Cited

U.S. PATENT DOCUMENTS

| 5,757,365 A | 5/1998 | Ho |
| 6,909,434 B2 | 6/2005 | Takala et al. |
| 7,420,593 B2 * | 9/2008 | Tunoda ..................... 348/222.1 |
| 8,547,602 B2 * | 10/2013 | Suzuki ......................... 358/448 |
| 2002/0180744 A1 | 12/2002 | Takala et al. |
| 2007/0152993 A1 | 7/2007 | Mesmer et al. |
| 2008/0001934 A1 | 1/2008 | Wyatt |
| 2008/0079739 A1 | 4/2008 | Gupta et al. |
| 2008/0143695 A1 | 6/2008 | Juenemann et al. |
| 2009/0274365 A1 * | 11/2009 | Tsuda et al. .................. 382/166 |

(Continued)

FOREIGN PATENT DOCUMENTS

| JP | 11-507736 | 7/1999 |
| JP | 2003-50571 | 2/2003 |

(Continued)

OTHER PUBLICATIONS

Japanese Office Action for corresponding Japanese Application No. 2013-061510, mailed May 29, 2015, in 4 pages.

(Continued)

*Primary Examiner* — Jeffrey Chow
(74) *Attorney, Agent, or Firm* — Knobbe, Martens, Olson & Bear LLP

(57) ABSTRACT

According to one embodiment, an image processing apparatus includes a receiver, a write controller, and a transmission controller. The receiver is configured to receive image data which forms an image to be displayed on a display apparatus. The write controller is configured to control to divide the image data into a plurality of regions and write compressed image data obtained by compressing the image data for each region, to a frame memory. The transmission controller is configured to control to transmit, to the display apparatus, original image data, which is restored by reading the compressed image data from the frame memory and decompressing the compressed image data for each region. Each of the regions has an overlap portion which is overlapped by a part of an adjacent region.

20 Claims, 11 Drawing Sheets

(56) References Cited

U.S. PATENT DOCUMENTS

| | | |
|---|---|---|
| 2010/0129000 A1* | 5/2010 | Strom .......................... 382/253 |
| 2010/0149080 A1 | 6/2010 | Teranishi et al. |
| 2010/0246988 A1* | 9/2010 | Dekel .................... H03M 7/30 |
| | | 382/255 |
| 2011/0221780 A1 | 9/2011 | Inada et al. |
| 2011/0292059 A1 | 12/2011 | Kobayashi |
| 2012/0120083 A1 | 5/2012 | Kong et al. |
| 2012/0146968 A1 | 6/2012 | Glen |
| 2012/0207208 A1 | 8/2012 | Wyatt et al. |

FOREIGN PATENT DOCUMENTS

| | | |
|---|---|---|
| JP | 2003-131624 | 5/2003 |
| JP | 2009-518693 A | 5/2009 |
| JP | 2010-85779 | 4/2010 |
| JP | 2011-170386 | 9/2011 |

OTHER PUBLICATIONS

Decision of Rejection for Japanese Application No. 2013-061510, mailed Nov. 4, 2015 in 4 pages.

* cited by examiner

IMAGE PROCESSING APPARATUS AND IMAGE DISPLAY SYSTEM

CROSS REFERENCE TO RELATED APPLICATIONS

This application is based upon and claims the benefit of priority from the prior Japanese Patent Application No. 2013-61510, filed on Mar. 25, 2013, the entire contents of which are incorporated herein by reference.

FIELD

Embodiments described herein relate generally to an image processing apparatus and an image display system.

BACKGROUND

In recent years, many people use smartphones. Smartphones consume more power than conventional mobile phones. Therefore, it is a great challenge to reduce the power consumption of smartphones. The reduction of power consumption is also a significant challenge not only for the smartphones, but also for mobile devices such as laptop computers.

Even small smartphones increasingly have high resolution display panels. Therefore, if quality of displayed image degrades, the degradation may be highly visible.

DETAILED DESCRIPTION

In general, according to one embodiment, an image processing apparatus includes a receiver, a write controller, and a transmission controller. The receiver is configured to receive image data which forms an image to be displayed on a display apparatus. The write controller is configured to control to divide the image data into a plurality of regions and write compressed image data obtained by compressing the image data for each region, to a frame memory. The transmission controller configured to control to transmit, to the display apparatus, original image data, which is restored by reading the compressed image data from the frame memory and decompressing the compressed image data for each region. Each of the regions has an overlap portion which is overlapped by a part of an adjacent region. The transmission controller controls to transmit, to the display apparatus, a first region from which the image data of the overlap portion is removed, the first region being compressed later than a second region, the first region being adjacent to the second region, each of the first region and the second region being one of the plurality of regions.

Hereinafter, embodiments will be specifically described with reference to the drawings.

(First Embodiment)

Figure 1:
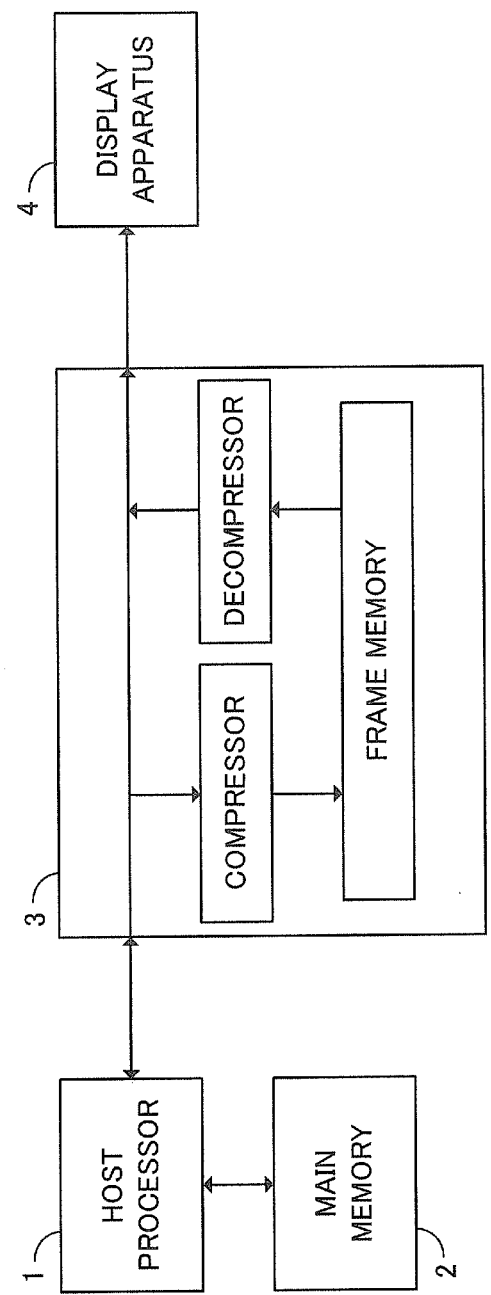
FIG. 1 is a block diagram showing an overview of an image display system according to a first embodiment.

FIG. 1 is a block diagram showing an overview of an image display system according to a first embodiment. The image display system includes a host processor 1, a main memory 2, a bridge chip (image processing apparatus) 3, and a display apparatus 4. The host processor 1 and the bridge chip are connected by, for example, MIPI (Mobile Industry Processor Interface). The bridge chip 3 and the display apparatus 4 are connected by, for example, LVDS (Low Voltage Differential Signaling).

In many cases, the same image is continuously displayed or only a part of an image (for example, cursor portion) changes on a display panel of an electronic device such as a smartphone and a personal computer. Therefore, if the image data of the entire image is transmitted from the host processor 1 to the display apparatus 4 for each frame, the power consumption increases. Hence, the image display system of the present embodiment stores a compressed image data in a frame memory in the bridge chip 3. When the image does not change, the image data is read from the frame memory, decompressed, and transmitted to the display apparatus 4. Thereby, the image data need not be outputted from the host processor 1 to the display apparatus 4 for each frame, so that the power consumption can be reduced. The capacity of the frame memory can be reduced by compressing the image data.

In the present embodiment, an image is divided into a plurality of regions and stored in the frame memory. Therefore, when only a part of the image changes, only a small region that changes may be rewritten. As a result, the amount of data outputted from the host processor 1 can be further reduced, so that the power consumption can be reduced.

As one of the features of the present embodiment, regions are set so that one or a plurality of lines overlap between regions. This is because if the overlap lines are not provided, when the compressed image data is decompressed, available spatial redundancy is limited, so that local degradation of image quality may occur at a boundary between the regions. It is possible to prevent the image quality from being degraded and display high-quality image by providing overlap lines.

Hereinafter, the image display system in FIG. 1 will be specifically described.

The host processor 1 reads image data stored in the main memory 2. The host processor 1 provides the image data converted into packets including mode information and a sync signal to the bridge chip 3. The sync signal includes a vertical sync signal Vsync indicating start and end of an image in the vertical direction and a horizontal sync signal Hsync indicating start and end of the image in the horizontal direction. The mode information is set to any one of "through mode", "panel self refresh (hereinafter referred to as PSR) mode", and "partially rewriting mode". For example, the mode information and various control information can be included in a header of the packet.

The bridge chip 3 includes a compressor, a decompressor, and the frame memory, and processes the image data according to a set mode.

When the mode information is set to the "through mode", the bridge chip 3 transmits the image data to the display apparatus 4 without storing the image data in the frame memory. The "through mode" is set when the entire displayed image is rewritten or the like.

When the mode information is set to the "PSR mode", the bridge chip 3 compresses the image data and writes the compressed image data to the frame memory. Subsequently, the bridge chip 3 reads the image data written to the frame memory, decompresses the image data, and transmits the image data and the sync signal to the display apparatus 4. While the image data is transmitted from the frame memory to the display apparatus 4, no image data is supplied from the host processor 1 to the bridge chip 3. The "PSR mode" is set when the image need not be rewritten for a certain period of time, such as when a still image is displayed.

When the mode information is set to the "partially rewriting mode", the bridge chip 3 rewrites a partial region of the image data written to the frame memory, which is specified by the host processor 1. In parallel with the above, the bridge chip 3 reads the image data written to the frame memory, decompresses the image data, and transmits the image data and the sync signal to the display apparatus 4. The "partially rewriting mode" is set when only a part of the image needs to be rewritten, or the like.

The display apparatus 4 displays an image according to the image data transmitted from the bridge chip 3 in synchronization with the vertical sync signal Vsync. When the vertical sync signal Vsync is not supplied, the display apparatus 4 holds the currently displayed image for a certain period of time.

Figure 2:
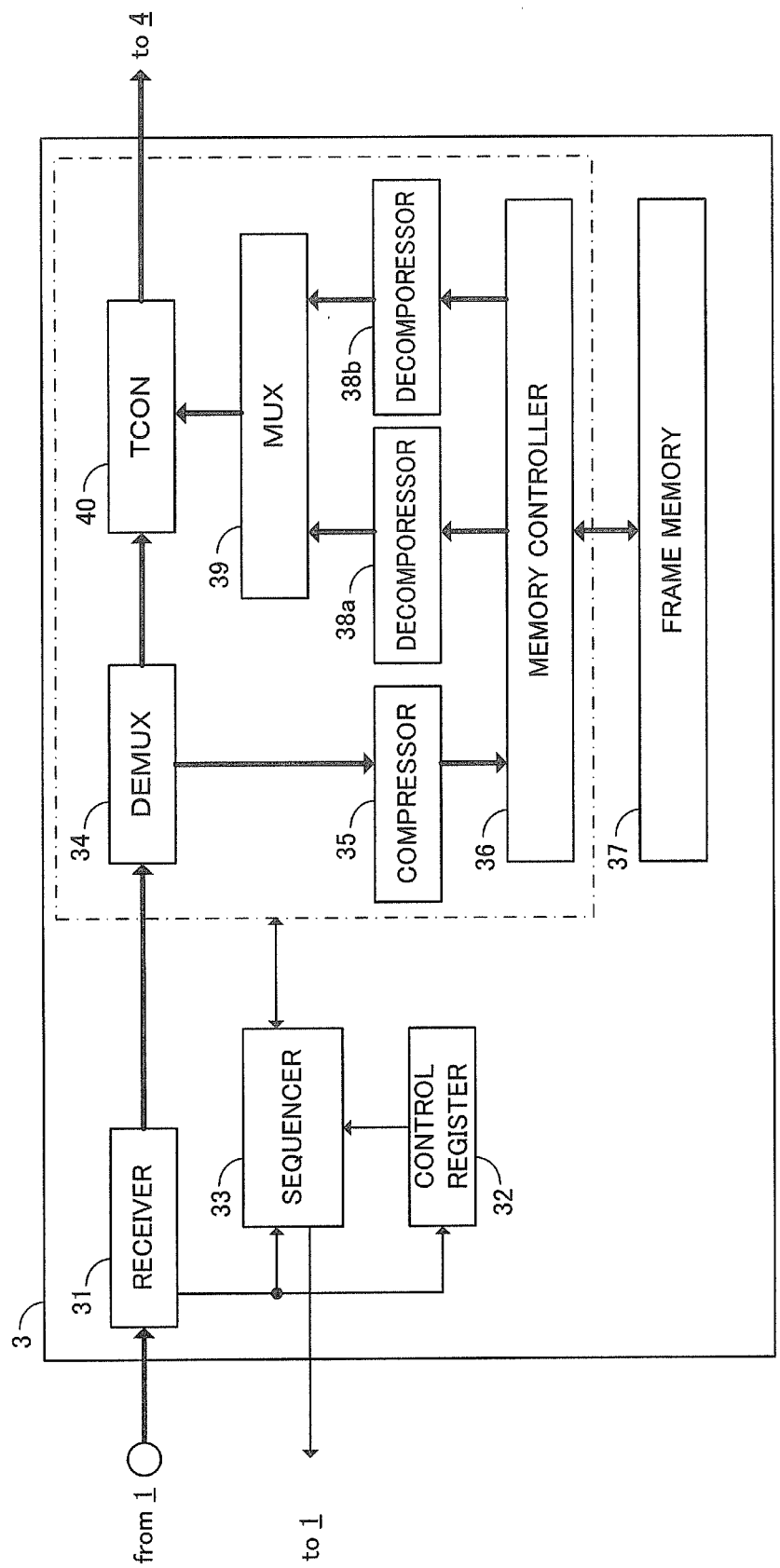
FIG. 2 is a block diagram showing the bridge chip 3 in more detail.

FIG. 2 is a block diagram showing the bridge chip 3 in more detail. The bridge chip 3 includes a receiver 31, a control register 32, a sequencer 33, a demultiplexer (DEMUX) 34, a compressor 35, a memory controller 36, a frame memory 37, decompressors 38a and 38b, a multiplexer (MUX) 39, and a timing controller (TCON) 40.

The receiver 31 receives a packet and the sync signals Vsync and Hsync from the host processor 1. The receiver 31 extracts the image data, the mode information, and the control information from the packet. The receiver 31 supplies the image data and the sync signals Vsync and Hsync to the demultiplexer 34 and supplies the mode information and the control information to the control register 32 and the sequencer 33.

The control register 32 stores parameters such as a maximum number of regions, the number of divided regions, an image width, the numbers of lines in each region, the number of overlap lines at a region boundary, a maximum number of overlap lines at a region boundary, a rewriting region ID, an update cycle of the sync signal Vsync. The maximum number of regions and the maximum number of overlap lines at a region boundary are fixed values set according to the capacity of the frame memory 37 in advance, and the other values are variably set by the control information supplied from the host processor 1.

The sequencer 33 controls each component of the bridge chip 3 on the basis of the parameters set in the control register 32. The sequencer 33 also supplies the sync signals Vsync and Hsync transmitted to the display apparatus 4 also to the host processor 1 in order to synchronize the bridge chip 3 and the host processor 1.

The demultiplexer 34 supplies the image data and the sync signals Vsync and Hsync to the compressor 35 and the timing controller 40. The compressor 35 compresses the image data and supplies the generated compressed image data to the memory controller 36. As a compression manner, for example, a correlation between spatial images close to each other can be used. For example, the compressor 35 compresses image data of an (n+1)th line by referring to image data of an nth line (n is an arbitrary integer). In the present embodiment, it is assumed that the compression ratio is independent of image data and is constant for each line or each set of lines.

The memory controller 36 receives the compressed image data and writes the compressed image data to the frame memory 37. Since the compression ratio is constant for each line or each set of lines, it is possible to identify the compressed image data of which line is written to which address in the frame memory 37. The memory controller 36 reads the compressed image data from the frame memory 37 and supplies the compressed image data to the decompressors 38a and 38b.

A combination of the compressor 35 and the memory controller 36 forms a write controller.

The frame memory 37 is, for example, a DRAM (Dynamic Random Access Memory) and has a capacity capable of storing not only image data of one frame, but also image data corresponding to the maximum number of regions and the maximum number of overlap lines. The frame memory 37 may be provided in the bridge chip 3 as an eDRAM (Embedded DRAM) as shown in FIG. 2, may be an SRAM (Static Random Access Memory) instead of the eDRAM, or may be provided outside the bridge chip 3 by using an external DRAM.

The frame memory 37 includes at least two ports, and thus, it is possible to read two data from one or two addresses of the frame memory 37 at the same time. Further, it is also possible to write data to one address while reading data from the other address of the frame memory 37.

The decompressors 38a and 38b receive the compressed image data from the memory controller 36. The decompressors 38a and 38b decompress the compressed image data to restore the original image data, and supplies the original image data and the sync signals Vsync and Hsync to the multiplexer 39. The decompressors 38a and 38b perform a decompression process, which is a reverse process of the compression process performed by the compressor 35. For example, when the compressor 35 compresses the image data by using a correlation between spatial pixels, the decompressors 38a and 38b decompress the compressed image data by also using the correlation between spatial pixels. For example, the decompressors 38a and 38b decompress the compressed image data of the (n+1)th line by referring to the image data restored by decompressing the compressed image data of the nth line.

The multiplexer 39 selects the image data supplied from the decompressor 38a or 38b according to the control of the sequencer 33, and supplies the selected image data to the timing controller 40.

The timing controller 40 transmits the image data and the sync signals Vsync and Hsync to the display apparatus 4. The timing controller 40 can mask (ignore) the sync signals according to the control of the sequencer 33.

A combination of the decompressors 38*a* and 38*b*, the multiplexer 39, and the timing controller 40 forms a transmission controller.

Figure 3:
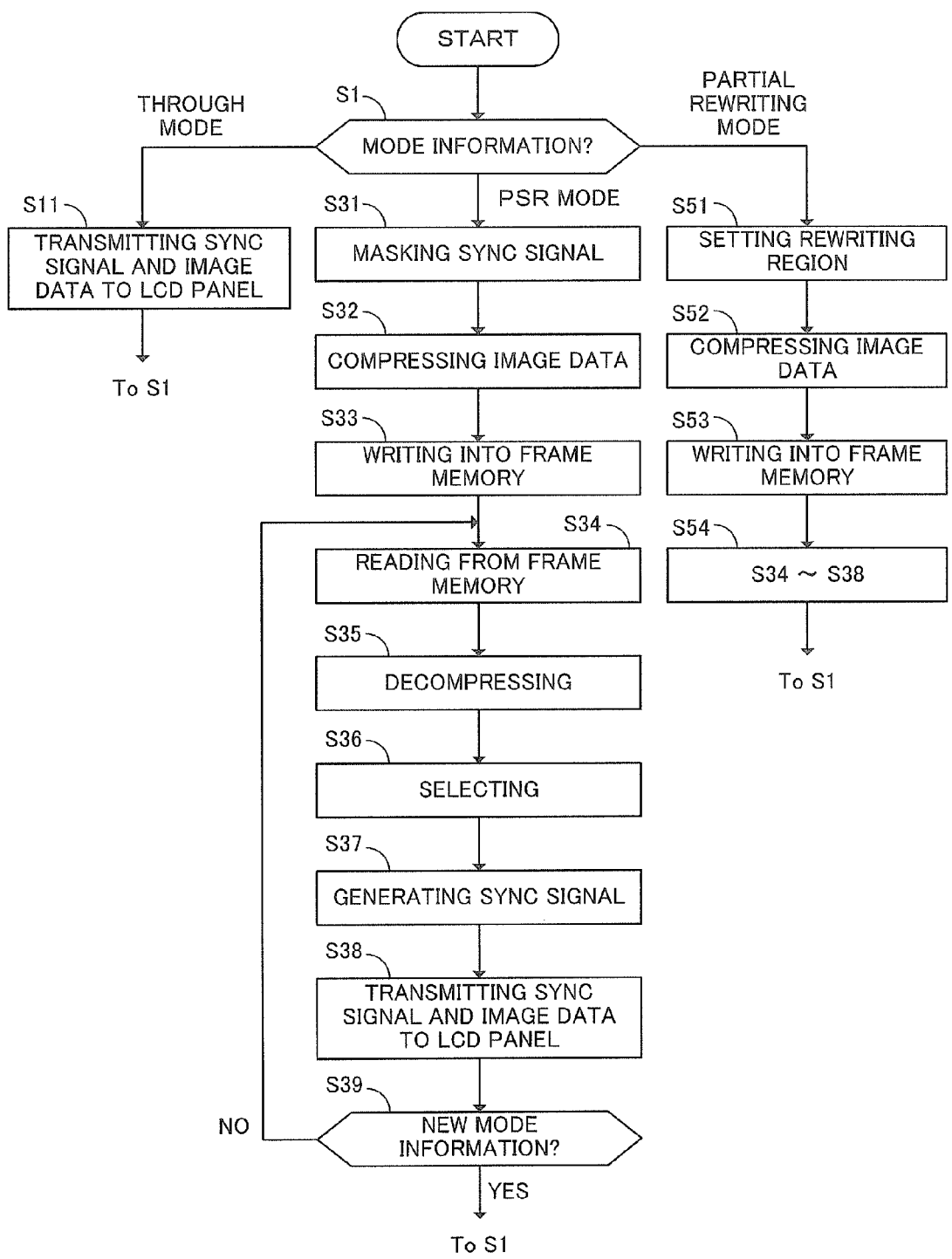
FIG. 3 is a flowchart showing an example of the processing of the bridge chip 3.

FIG. 3 is a flowchart showing an example of the processing of the bridge chip 3. The bridge chip 3 performs processing according to the mode information (Si). Hereinafter, the processing of the bridge chip 3 in the "through mode", the "PSR mode", and the "partially rewriting mode" will be described in this order.

Figure 4:
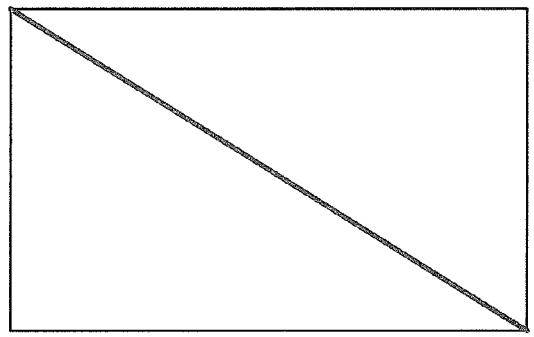
FIG. 4 is a diagram showing an example of an image represented by the image data inputted into the bridge chip 3.

The processing in the "through mode" will be described. FIG. 4 is a diagram showing an example of an image represented by the image data inputted into the bridge chip 3. The illustrated image includes a diagonal line connecting the upper-left corner and the lower-right corner. In the "through mode", the image data corresponds to the entire image shown in FIG. 4 and the data is arranged from the upper-left corner to the lower-right corner of the image in a raster order without being overlapped.

Figure 5:
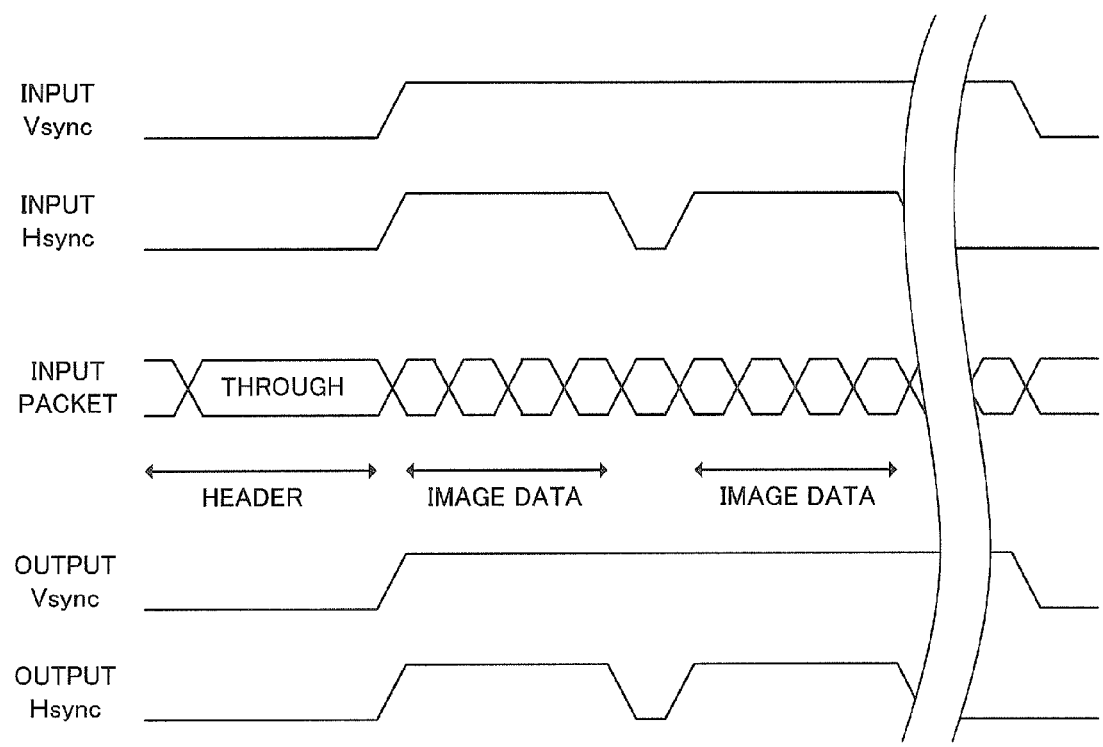
FIG. 5 is a timing chart of the sync signals Vsync and Hsync and a packet which are inputted from the host processor 1, and the sync signals Vsync and Hsync outputted from the bridge chip 3.

FIG. 5 is a timing chart of the sync signals Vsync and Hsync and a packet which are inputted from the host processor 1, and the sync signals Vsync and Hsync outputted from the bridge chip 3. The value of the horizontal sync signal Hsync is switched in synchronization with pixel data located at the left end and the right end in the horizontal direction of the image. Similarly, the value of the vertical sync signal Vsync is switched in synchronization with pixel data located at the upper-left corner and the lower-right corner of the image.

When the sequencer 33 recognizes that the "through mode" is set on the basis of the mode information, the sequencer 33 does not activate the compressor 35, the decompressors 38*a* and 38*b* and the multiplexer 39. Therefore, no signal is outputted from the multiplexer 39 to the timing controller 40. The sequencer 33 controls the timing controller 40 to transmit the image data and the sync signals Vsync and Hsync supplied from the demultiplexer 34 to the display apparatus 4 as they are. The demultiplexer 34 transmits the image data and the sync signals to the display apparatus 4 (S11).

The display apparatus 4 switches the displayed image in synchronization with the vertical sync signal Vsync. In this way, in the "through mode", the bridge chip 3 causes the display apparatus 4 to display the image data of the entire supplied image without writing the image data to the frame memory 37.

Next, the processing in the "PSR mode" will be described. In the "PSR mode", the mode information set to the "PSR mode" and the image data of the entire image are supplied to the bridge chip 3. The sequencer 33 recognizes that the "PSR mode" is set on the basis of the mode information.

In the "PSR mode", the bridge chip 3 performs processing to compress the image data and write the compressed image data to the frame memory 37 (first processing) and processing to read the compressed image data from the frame memory 37 and decompress the compressed image data (second processing). Thereafter, the second processing is repeatedly performed until the receiver 31 receives a new packet.

Figure 6:
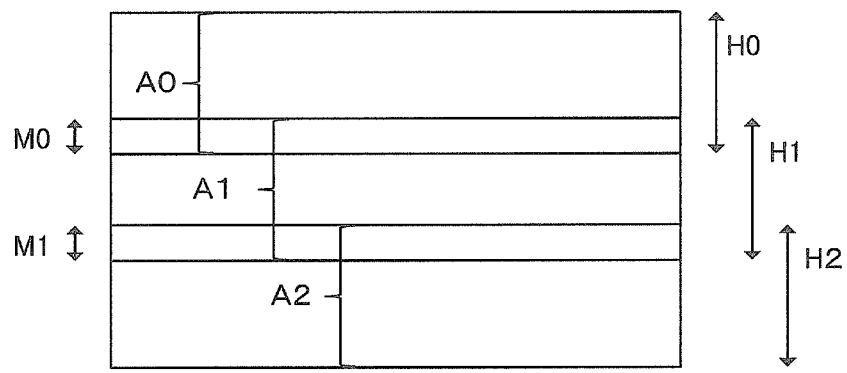
FIG. 6 is a diagram schematically showing divided images according to the first embodiment.
Figure 7:
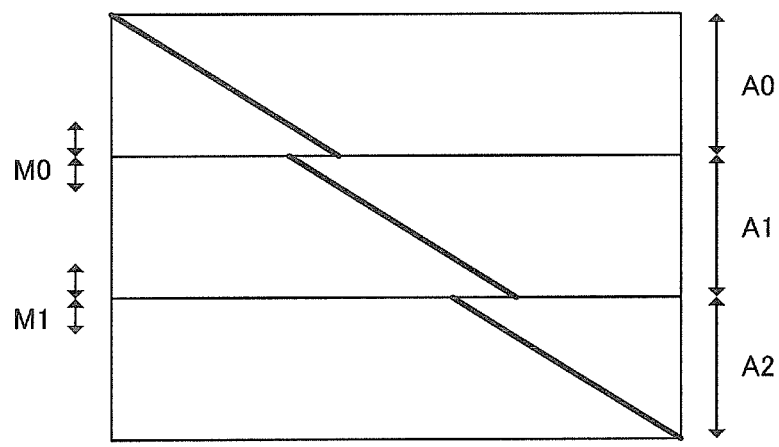
FIG. 7 is a diagram for explaining the image data supplied to the bridge chip 3 from the host processor 1.
Figure 8:
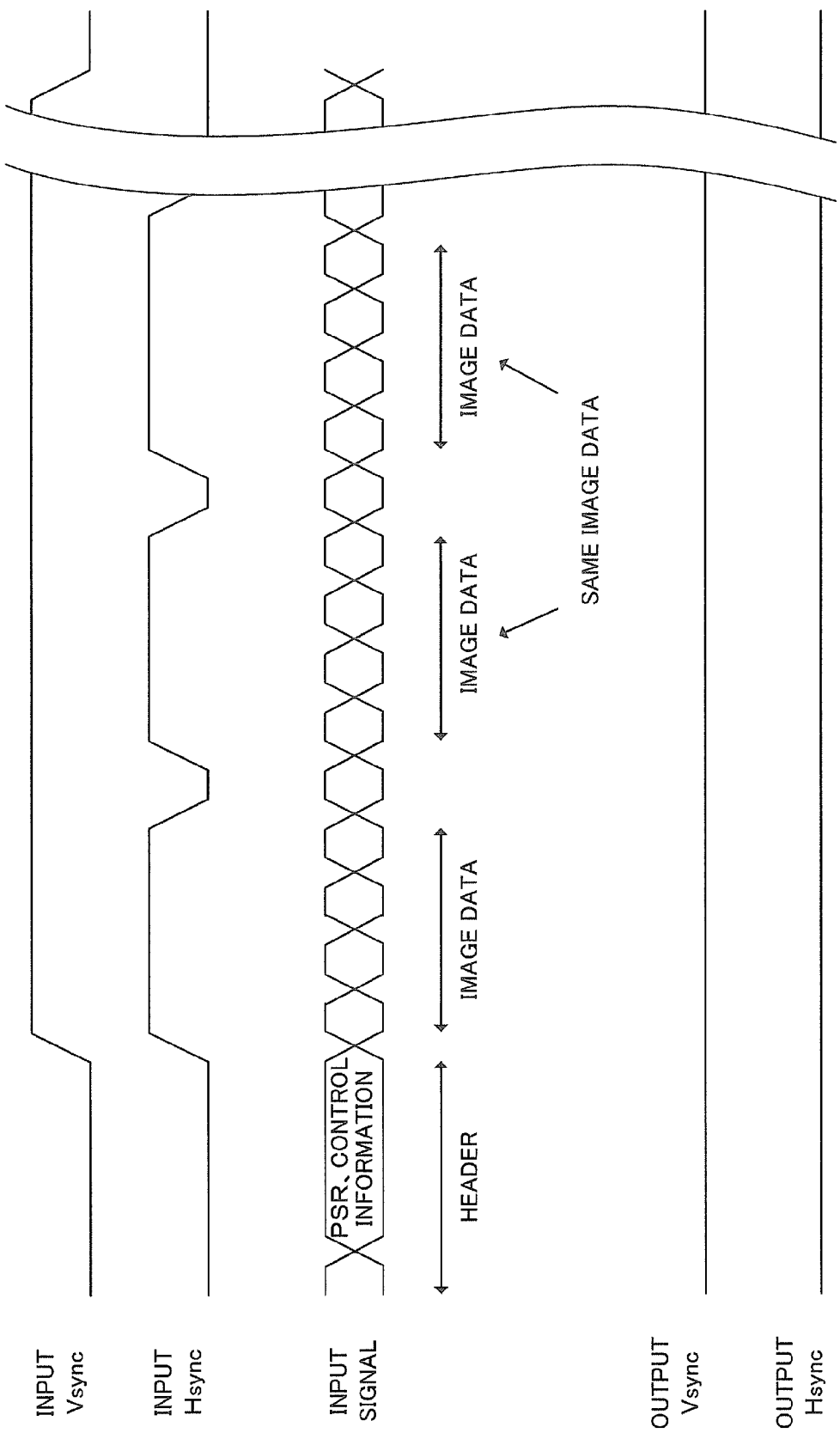
FIG. 8 is a timing chart of the sync signals Vsync and Hsync and a packet which are inputted from the host processor 1, and the sync signals Vsync and Hsync outputted from the bridge chip 3.

FIGS. 6 to 8 are diagrams for explaining the first processing in the "PSR mode". FIG. 6 is a diagram schematically showing divided images according to the first embodiment. The image is divided into a plurality of regions in one direction. Each region includes a plurality of lines. Each region includes overlap lines (overlap portion) overlapping an adjacent region and non-overlap lines (non-overlap portion) not overlapping other regions.

FIG. 6 shows an example in which three regions A0 to A2 are set in the horizontal direction. The numbers of lines in the regions A0 to A2 are H0 to H2, respectively. Upper M0 lines of the region A1 are the overlap lines that overlap the region A0. Similarly, upper M1 lines of the region A2 are the overlap lines that overlap the region A1. In other words, the overlap lines are provided in an upper portion of a region.

The number of divided regions, which indicates the number of regions to be set, can be freely set by the host processor 1 as long as the number of divided regions is smaller than the maximum number of regions which is predetermined and set in the control register 32. The number of overlap lines in each region can be freely set by the host processor 1 as long as the number of overlap lines is smaller than the maximum number of overlap lines at a region boundary, which is predetermined and set in the control register 32. More specifically, the host processor 1 reads the maximum number of regions and the maximum number of overlap lines at a region boundary from the control register 32 and sets the number of divided regions and the number of overlap lines to values smaller than the maximum number of regions and the maximum number of overlap lines, respectively. Also, the host processor 1 can arbitrarily determine the numbers of lines in each region.

The number of divided regions and the numbers of lines in each region may be fixed values or may be individually determined by the host processor 1 according to an image to be displayed on the display apparatus 4. For example, it is desirable that the number of divided regions and the numbers of lines in each region are determined so that a portion of the image where the correlation in the vertical direction is strong does not become a boundary between regions. When there is an object that is assumed to be motionless for a relatively long time, the object may be contained in one region.

The host processor 1 sets the control information including information of the number of divided regions, the numbers of lines in each region, and the number of overlap lines between regions in the header of a packet and supplies the packet to the bridge chip 3.

The first processing will be described. When the image data is supplied in the "PSR mode", while the compressed image data is written to the frame memory 37, the timing controller 40 masks the sync signals Vsync and Hsync (S31). When the sync signals Vsync and Hsync are masked, the image data is not supplied to the display apparatus 4. The display apparatus 4 holds the currently displayed image.

In the "PSR mode", the image data of the overlap lines is supplied twice from the host processor 1 to the bridge chip 3. For example, when the image shown in FIG. 4 is displayed, the host processor 1 supplies the image data of overlap lines (that is, the upper M0 lines in the region A1 and the upper M1 lines in the region A2) twice to the bridge chip 3 as shown in FIG. 7. As a result, the image data of a total of (H0+H1+H2) lines is supplied to the bridge chip 3.

In this way, the bridge chip 3 receives the image data representing an image (FIG. 7) different from the image to be displayed (FIG. 4), so that the bridge chip 3 cannot display the received image data as it is. Therefore, when the sequencer 33 receives the mode information set to the "PSR mode", the sequencer 33 controls the timing controller 40 to mask the sync signals Vsync and Hsync supplied from the demultiplexer 34. As a result, as shown in FIG. 8, the sync signals Vsync and Hsync are not supplied from the bridge chip 3 to the display apparatus 4. Therefore, the display apparatus 4 holds the currently displayed image. The receiver 31 extracts information of the number of divided regions, the numbers of lines in each region, and the number of overlap lines from the header and sets the information in the control register 32. The sequencer 33 controls the compressor 35 to compress the image data supplied from the demultiplexer 34. The compressor 35 compresses the image data for each region and generates compressed image data (S32). The memory controller 36 writes the compressed image data to the frame memory 37 (S33). The image data corresponding to the image shown in FIG. 7 is written to the frame memory 37. In other words, the compressed image data of the overlap lines is written to the frame memory 37 twice.

Here, since the compression ratio is constant, the sequencer 33 can know the image data of which position (positions in the horizontal direction and the vertical direction) in the image is written to which address in the frame memory 37 on the basis of the number of divided regions, the number of overlap lines, and the numbers of lines in each region, which are set.

Next, the second processing will be described. The memory controller 36 sequentially reads the compressed image data from the frame memory 37 (S34). The decompressors 38*a* and 38*b* decompress the compressed image data for each region in order of compression and restore the original image data (S35). More specifically, the decompressors 38*a* and 38*b* alternately decompress the read compressed image data for each region. In the present embodiment, the decompressor 38*a* decompresses the regions A0 and A2 and the decompressor 38*b* decompresses the region A1.

The multiplexer 39 alternately selects output data of the decompressor 38*a* and 38*b* and supplies the selected output data to the timing controller 40 so that the image is correctly displayed on the display apparatus 4 (S36). Regarding the regions whose order of compression is A1 or later, the multiplexer 39 outputs data of non-overlap lines other than data of overlap lines.

The decompressors 38*a* and 38*b* generate the sync signals Vsync and Hsync and output the sync signals Vsync and Hsync along with the decompressed image data (S37). The timing controller 40 transmits the image data selected by the multiplexer 39 and the sync signals Vsync and Hsync to the display apparatus 4 (S38).

A cycle of the second processing is determined by the update cycle of the sync signal Vsync set in the control register 32. For example, the display apparatus 4 operates at 60 fps (frame per second) and can hold the image displayed on the display apparatus 4 at most 1 second even when the sync signal Vsync and the image data are not supplied. In other words, in the case of a still image, the sync signal Vsync only has to be inputted once a second. In this case, the image data and the sync signal Vsync may be supplied to the display apparatus 4 once every 60 frames.

The update cycle of the sync signal Vsync is a parameter that indicates a cycle for supplying the sync signal Vsync and the like to the display apparatus 4, and is set according to the time for which the display apparatus 4 can hold the image data.

The sequencer 33 controls the timing controller 40 so that the sync signal Vsync is generated at a cycle according to the update cycle of the sync signal Vsync. Further, the sequencer 33 controls the decompressors 38*a* and 38*b* so that the compressed image data is decompressed at a cycle according to the update cycle of the sync signal Vsync.

Figure 9:
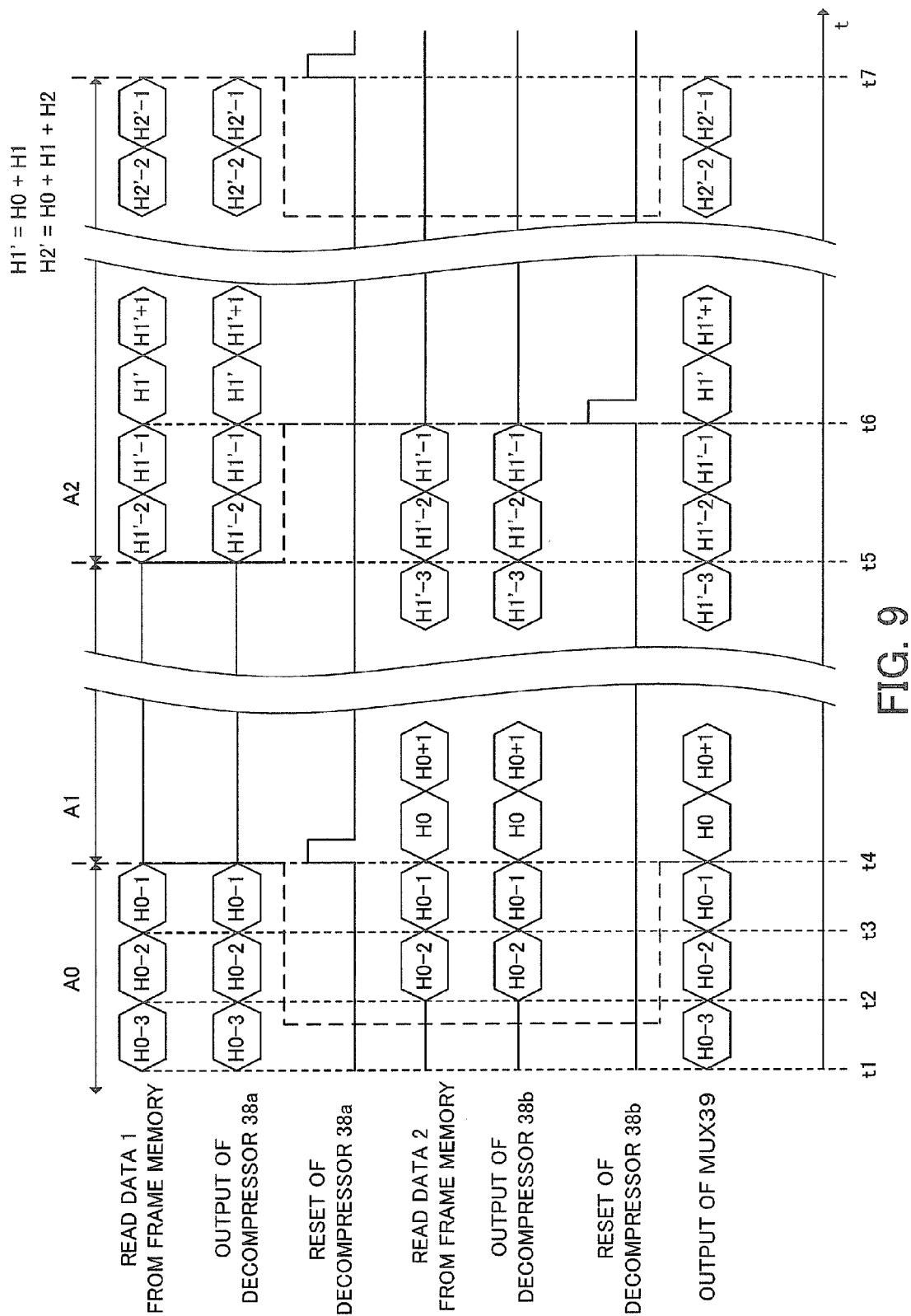
FIG. 9 is a timing chart of reading the image data from the frame memory 37 and transmitting the image data to the display apparatus 4.

FIG. 9 is a timing chart of reading the image data from the frame memory 37 and transmitting the image data to the display apparatus 4. FIG. 9 shows an example in which the numbers of overlap lines M0 and M1 are 2. In FIG. 9, delays between components are ignored.

First, the sequencer 33 controls the memory controller 36 on the basis of the information of the number of divided regions, the numbers of lines in each region, and the number of overlap lines. The memory controller 36 reads the compressed image data of the region A0 (0th to (H0−1)th lines) from a first port of the frame memory 37 on the basis of the number of lines of the first region A0. For example, in FIG. 9, the compressed image data of the (H0−3)th line is read between time t1 and time t2.

The read compressed image data is decompressed by the decompressor 38*a*.

The memory controller 36 reads the compressed image data of the (H0−2)th line from the first port and also reads the compressed image data of the (H0−2)th line in the region A1 from the second port between time t2 and time t3. The compressed image data read from the second port is decompressed by the decompressor 38*b*.

When the spatial correlation is used in the compression process, the correlation is also used in the decompression process. For example, when the compressed image data of the H0H0th line is decompressed, the image data of the (H0−2)th line and the (H0−1)th line may be used. In the present embodiment, when the compressed image data is decompressed, the image data of overlap lines can be used, so that even the image data of lines located at a boundary can be restored at high quality.

The decompressor 38*a* supplies the decompressed image data to the multiplexer 39. The decompressor 38*a* outputs position information indicating a position in an image of the image data that is being decompressed to the sequencer 33 according to an address in the frame memory 37.

The sequencer 33 controls the multiplexer 39 according to the position information. The multiplexer 39 supplies the image data of the 0th to the (H0−1)th lines, which is supplied from the decompressor 38*a*, to the timing controller 40. When the decompression process of the (H0−1)th line is completed, the sequencer 33 resets the decompressor 38*a*.

The decompressor 38*b* supplies the decompressed image data to the multiplexer 39. As a result, the image data of the (H0−2)th line and the (H0−1)th line is supplied to the multiplexer 39 from both the decompressors 38*a* and 38*b*. However, by the control of the sequencer 33, the multiplexer 39 outputs the image data of the (H0−2)th line and the (H0−1)th line from the decompressor 38*a*, but does not output the image data from the decompressor 38*b*.

When the multiplexer 39 completes the output of the image data from the decompressor 38*a*, the multiplexer 39 supplies the image data from the H0th line, which is supplied from the decompressor 38*b*, to the timing controller 40 according to the control of the sequencer 33. The image data of the (H0−2)th line and the (H0−1)th line, which is decompressed by the decompressor 38*b*, is not outputted from the multiplexer 39. The decompressor 38*b* decompresses the H0th line, the (H0+1)th line, and the like by using the image data of the (H0−2)th line and the (H0−1)th line, so that it is possible to prevent the image quality near the boundary between the region A0 and the region A1 from being degraded.

At time t5, which is a time two (=M1) lines before the process of the region A1 is completed, the memory controller 36 also reads the compressed image data of the (H0+H1−2)th line in the region A2 from the first port. The process between time t5 and time t6 is that same as the process between time t2 to time t4. Thereafter, the image data from the H1'th line in the region A2 is outputted from the multiplexer 39 and the transmission of the image data of the region A2 is completed at time t7.

In this way, the multiplexer 39 selects either one of the image data outputted from the decompressor 38*a* and 38*b* so that there is no overlap of the image from the first line of the image according to the control of the sequencer 33. The timing controller 40 transmits the image data and the sync signals Vsync and Hsync to the display apparatus 4.

Thereafter, the image data is transmitted from the frame memory 37 to the display apparatus 4 until new mode information and image data are received. During this time, no image data is supplied from the host processor 1 to the bridge chip 3, so that the power consumption can be reduced. The boundary between regions is redundantly written to the frame memory 37, so that it is possible to prevent the image quality from being degraded between the regions.

Next, the processing in the "partially rewriting mode" will be described. In the "partially rewriting mode", a part of the compressed image data written to the frame memory 37 is rewritten region by region. Instead of the entire image, only a part of the regions is rewritten, so that the amount of transmission of the image data from the host processor 1 to the bridge chip 3 decreases, thereby, reducing the power consumption.

In the "partially rewriting mode", the mode information set to the "partially rewriting mode" is supplied to the bridge chip 3 from the host processor 1. The sequencer 33 recognizes that the "partially rewriting mode" is set on the basis of the mode information.

When the partial rewriting is performed, the host processor 1 sets a rewriting region ID indicating the region to be rewritten in the header of the packet. The rewriting region ID is set in the control register 32 (S51). When the regions are set as shown in FIG. 4, the rewriting region ID indicates one of A0 to A2.

The sequencer 33 calculates the start address of the frame memory 37 where the compressed image data of the region which is to be rewritten is written on the basis of the parameters set in the control register 32 such as the rewriting region ID. The memory controller 36 sequentially writes the compressed image data generated by the compressor 35 from the calculated start address (S52, S53). When the rewriting of the region is completed, the sequencer 33 asserts a write completion signal to the host processor 1.

In the "partially rewriting mode", the second processing in the "PSR mode", that is, reading of the compressed image data from the frame memory 37, is also performed in parallel (S54). Therefore, it is necessary to perform control so that the rewriting of a region and the reading of the compressed image data do not occur at the same time.

Therefore, the host processor 1 receives the sync signal from the bridge chip 3 and controls the timing of performing the partial rewriting. Specifically, the host processor 1 receives the sync signals Vsync and Hsync and counts the horizontal sync signal Hsync from the rising of the vertical sync signal Vsync, so that the host processor 1 can know what number of line in the compressed image data is currently read from the frame memory 37. For example, the host processor 1 may perform the partial rewriting during a vertical blanking period. While the compressed image data of an upper region in the image (for example, the region A0 in FIG. 4) is being read, a lower region (the region A2) in the image may be rewritten.

In the first embodiment, the image is divided into a plurality of small regions and written to the frame memory 37. Therefore, in the "partially rewriting mode", only a part of the frame memory 37 (a desired region) can be rewritten. Thereby, the amount of data transmission from the host processor 1 to the bridge chip 3 decreases, so that the power consumption can be reduced.

The image is written to the frame memory 37 so that one or a plurality of lines overlap between the divided regions. Therefore, when the compressed image data is decompressed, it is possible to prevent the image quality from being degraded at a boundary between regions.

(Second Embodiment)

In the first embodiment, lines near a boundary are overlapped and supplied from the host processor 1 to the bridge chip 3 in the "PSR mode". On the other hand, in a second embodiment, lines are supplied without being overlapped. In the second embodiment, the first processing in the "PSR mode" is different from that in the first embodiment.

Figure 10:
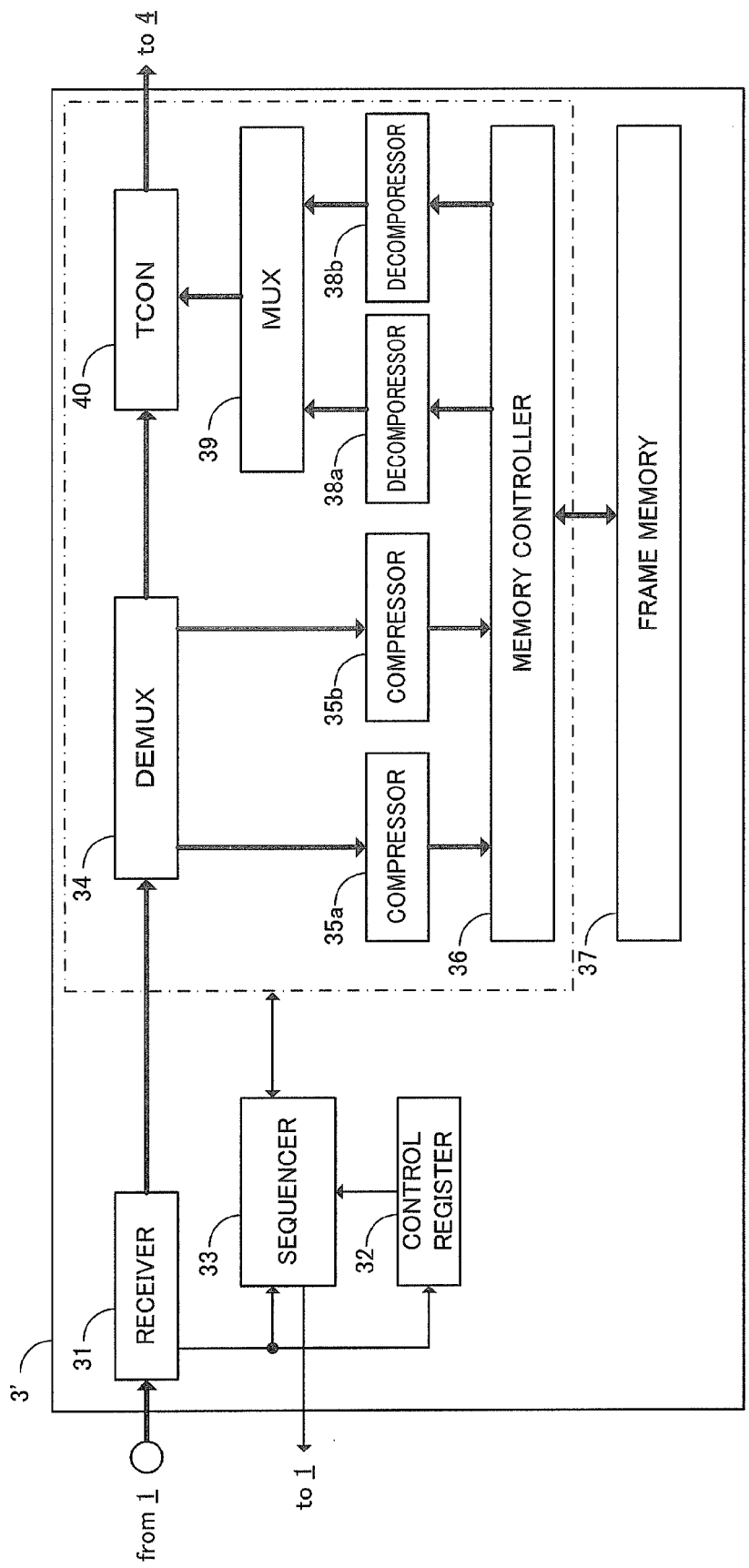
FIG. 10 is a block diagram showing an overview of a bridge chip 3' according to the second embodiment.

FIG. 10 is a block diagram showing an overview of a bridge chip 3' according to the second embodiment. In FIG. 10, the same components as those in FIG. 2 are denoted by the same reference numerals, and the difference will be mainly described below. The bridge chip 3' includes two compressors 35a and 35b. In the present embodiment, the timing controller 40 need not has the function to mask the sync signals Vsync and Hsync.

Figure 11:
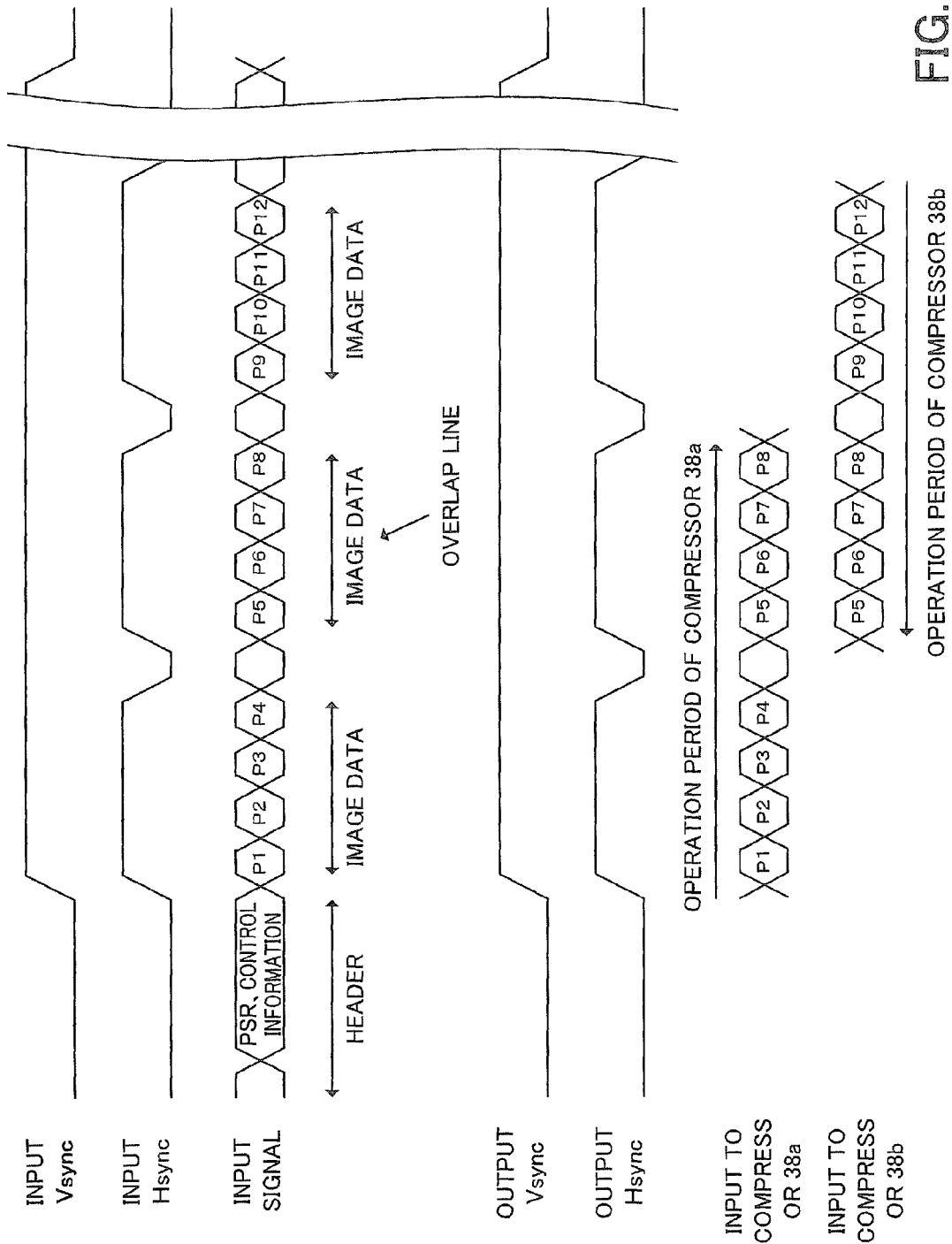
FIG. 11 is a timing chart of the sync signals (input Vsync and Hsync) and a packet (input signal) which are supplied from the host processor 1 to the bridge chip 3' and the sync signals (output Vsync and Hsync) supplied from the bridge chip 3' to the display apparatus 4.

FIG. 11 is a timing chart of the sync signals (input Vsync and Hsync) and a packet (input signal) which are supplied from the host processor 1 to the bridge chip 3' and the sync signals (output Vsync and Hsync) supplied from the bridge chip 3' to the display apparatus 4.

In the second embodiment, the image data of the entire image to be displayed is supplied from the host processor 1 to the bridge chip 3' in the "PSR mode". Therefore, the timing controller 40 transmits the image data and the sync signals Vsync and Hsync, which are received by the receiver 31, to the display apparatus 4 in the same manner as in the "through mode".

The receiver 31 extracts the number of divided regions, the numbers of lines in each region, and the number of overlap lines between regions from the control information included in the header and sets the extracted information in the control register 32.

The sequencer 33 controls the demultiplexer 34 to output the image data including overlap lines for each region to the compressors 35a and 35b on the basis of set parameters. According to the control, for example, the compressor 35a compresses the image data of the regions A0 and A2 in FIG. 6 and the compressor 35b compresses the image data of the region A1 in FIG. 6.

The memory controller 36 writes the compressed image data generated by the compressors 35a and 35b to the frame memory 37. The memory controller 36 writes the image data generated by the compressor 35b to a second port of the frame memory 37 while writing the image data generated by the compressor 35a to a first port of the frame memory 37. Here, the address when writing to the second port is sufficiently different from the address when writing to the first port for storing the compressed data of a region. As a result, also in the present embodiment, the image data corresponding to the image shown in FIG. 7 is written to the frame memory 37. The other processing operations are the same as those in the first embodiment.

In this way, in the second embodiment, the image data of regions including overlap lines are outputted from the demultiplexer 34, the compression processes of the two compressors are performed in parallel, and the compressed image data are written to the frame memory 37. Therefore, the image data corresponding to the image to be displayed may be received from the host processor 1 without overlapping image data. Therefore, it is possible to transmit the image data to the display apparatus 4 without masking the sync signals received from the host processor 1, so that the image quality can be further improved.

(Third Embodiment)

In the first and the second embodiments, a part of the image data is overlapped and written to the frame memory 37. On the other hand, in a third embodiment, each image data is written to the frame memory 37 once and a line memory that stores boundary lines between regions is provided.

Figure 12:
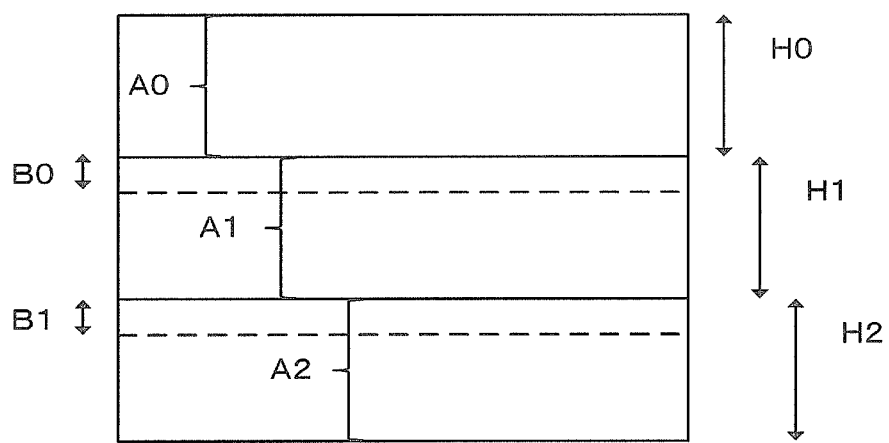
FIG. 12 is a diagram schematically showing the regions in the third embodiment.

FIG. 12 is a diagram schematically showing the regions in the third embodiment. In the present embodiment, the regions are set so that the regions do not overlap each other. Further, boundary lines are provided between a region and an adjacent region.

In the example shown in FIG. 12, the regions A0 to A2, which do not overlap each other, are set. The numbers of lines in the regions A0 to A2 are H0 to H2, respectively. Boundary lines, which are a part of the region A1, are set at a boundary between the region A1 and the region A0. The number of the boundary lines is BO. Similarly, boundary lines, which are a part of the region A2, are set at a boundary between the region A2 and the region A1. The number of the boundary lines is B1. In this way, the boundary lines are set in upper portions of the regions A1 and A2. No boundary line is provided in the uppermost region A0.

Figure 13:
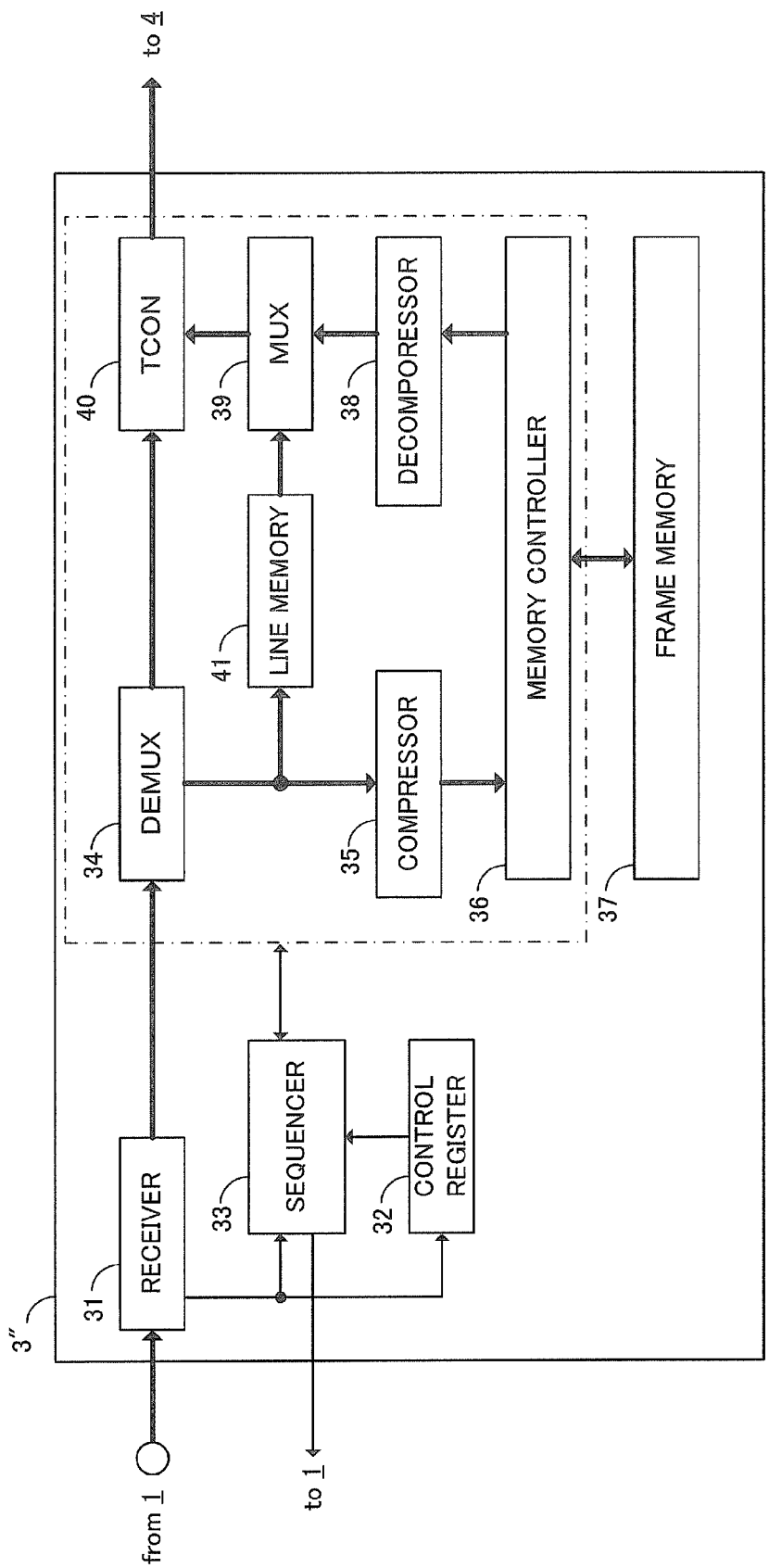
FIG. 13 is a block diagram showing an overview of a bridge chip 3" according to the third embodiment.

FIG. 13 is a block diagram showing an overview of a bridge chip 3" according to the third embodiment. Hereinafter, the differences from the first and the second embodiments will be mainly described. The bridge chip 3" includes a compressor 35, a decompressor 38, and a line memory 41. The line memory 41 is, for example, an SRAM (Static Random Access Memory) and has a capacity capable of storing the image data of lines, the number of which is determined by the maximum number of regions and the maximum number of boundary lines.

In the present embodiment, an example is described in which the image data of the boundary lines is written in the line memory 41 without being compressed. Compressed image data may be written to the line memory 41 by providing another compressor. Thereby, the capacity of the line memory 41 can be reduced. However, generally, the area of the compressor is greater than the reduction amount of the line memory 41, so that the image data inputted into the line memory 41 is not compressed in the present embodiment. Of course, when the area of the compressor is small, the compressed image data may be written to the line memory 41 by providing the compressor.

In the present embodiment, in the same manner as in the second embodiment, the image data is supplied from the host processor 1 to the bridge chip 3" without being overlapped. In the present embodiment, the first and the second processing in the "PSR mode" and the write manner to the frame memory 37 in the "partially rewriting mode" are different from those in the first and the second embodiment.

In the "PSR mode", the host processor 1 supplies the control information indicating the number of divided regions, the numbers of lines in each region, and the number of boundary lines to the bridge chip 3". The receiver 31 sets these parameters in the control register 32.

In the first processing in the "PSR mode", the compressor 35 compresses the image data supplied from the host processor 1 for each region and writes the compressed image data to the frame memory 37 on the basis of the set parameters.

The sequencer 33 performs control to recognize the boundary lines based on the set parameters and write the image data of the boundary lines to the line memory 41.

On the other hand, in the second processing in the "PSR mode", the multiplexer 39 selects the image data decompressed by the decompressor 38 for the image data other than the boundary lines, selects the image data read from the line memory 41 for the image data of the boundary lines, and supplies the image data to the timing controller 40.

Since the boundary lines are located in an upper portion of a region, the decompressor 38 can not always restore the image data of the boundary lines at high quality. Therefore, in the present embodiment, the image data which is stored in the line memory 41 without being compressed is used for the boundary lines. Thereby, it is possible to prevent the quality of the image of a boundary between regions displayed on the display apparatus 4 from being degraded.

In the selection process of the multiplexer 39, the boundary lines can be known from the number of divided regions, the numbers of lines in each region, and the number of boundary lines.

In the "partially rewriting mode", the compressor 35 rewrites compressed image data of a region specified by the host processor 1 in the compressed image data written to the frame memory 37. In addition, the compressor 35 rewrites image data of boundary lines of a region specified by the host processor 1 in the image data written to the line memory 41. The other operations are the same as those in the first and the second embodiments.

As described above, in the third embodiment, the line memory 41 that stores the boundary lines between the regions is provided. When the image data is transmitted to the display apparatus 4, the image data stored in the line memory 41 is selected for the boundary lines. Therefore, it is possible to improve the quality of the displayed image.

Although, in each embodiment, an example is described in which the image is divided in the horizontal direction to set the regions, the regions may be set by any manner.

At least a part of the image processing system explained in the above embodiments can be formed of hardware or software. When the image processing system is partially formed of the software, it is possible to store a program implementing at least a partial function of the image processing system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the image processing system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:
1. An image processing apparatus comprising:
  a receiver configured to receive image data which forms an image to be displayed on a display apparatus;
  a write controller configured to control to divide the image data into a plurality of regions and write compressed image data obtained by compressing the image data for each region, to a frame memory; and a transmission controller configured to control to transmit, to the display apparatus, original image data, which is restored by reading the compressed image data from the frame memory and decompressing the compressed image data for each region, wherein each of the regions comprises an overlap portion which is overlapped by a part of an adjacent region, the overlap portion being used for compression and decompression of the image data at a boundary of adjacent two regions, and the transmission controller controls to transmit, to the display apparatus, a first region from which the image data of the overlap portion is removed, the first region being compressed later than a second region, the first region being adjacent to the second region, each of the first region and the second region being one of the plurality of regions.

2. The apparatus of claim 1, wherein the receiver receives the image data of the overlap portion redundantly.

3. The apparatus of claim 1, wherein
the receiver receives a sync signal in addition to the image data,
the display apparatus updates a displayed image in synchronization with the sync signal, and
the transmission controller masks the sync signal while the write controller is writing the compressed image data to the frame memory.

4. The apparatus of claim 3, wherein
the display apparatus can hold a displayed image for a first period of time, and
the transmission controller generates the sync signal with a period according to the first period of time and transmits the restored original image data to the display apparatus.

5. The apparatus of claim 1, wherein the write controller comprises:
a plurality of compressors configured to compress the image data for each region to generate the compressed image data, and
a memory controller configured to write the compressed image data generated by the plurality of compressors to the frame memory.

6. The apparatus of claim 5, wherein
the plurality of compressors compress image data comprising the overlap portion to generate the compressed image data, and
the memory controller controls to write the compressed image data comprising the overlap portion to the frame memory.

7. The apparatus of claim 1, wherein each of the regions comprises a plurality of lines that form an image to be displayed on the display apparatus.

8. The apparatus of claim 1, wherein the transmission controller comprises:
a plurality of decompressors configured to decompress the compressed image data for each region to restore the image data,
a multiplexer configured to select the image data restored by one of the plurality of decompressors to output the selected image data, and
a timing controller configured to transmit the image data outputted from the multiplexer to the display apparatus.

9. The apparatus of claim 8, wherein the timing controller transmits, to the display apparatus, the first region from which the image data of the overlap portion is removed.

10. The apparatus of claim 9, wherein
each of the regions comprises a plurality of lines that form an image to be displayed on the display apparatus,
the receiver receives control information indicative of a first numbers of lines in each of the regions and a second number of lines in the overlap portion, and
the plurality of decompressors selectively decompress the read compressed image data for each region based on the control information.

11. The apparatus of claim 8, wherein
the plurality of decompressors comprises first and second decompressors, and
the first and the second decompressors alternately decompress the read compressed image data for each region.

12. The apparatus of claim 1, wherein
when the receiver receives rewriting region information indicative of one of the plurality of regions and the image data of a region indicated by the rewriting region information,
the write controller generates compressed image data by compressing the image data in the region received by the receiver, and rewrites compressed image data, which is written to the frame memory, of the region indicated by the rewriting region information.

13. An image processing apparatus comprising:
a receiver configured to receives image data which forms an image to be displayed on a display apparatus;
a write controller configured to control to generate compressed image data by sequentially compressing image data in a plurality of regions for each region, the regions being displayed adjacently on the display apparatus, and to write the generated compressed image data to a frame memory;
a memory configured to store the image data which is a part of the region and located at a boundary portion between the region and another region adjacent to the region;
a decompressor configured to restore original image data by decompressing compressed image data read from the frame memory for each region in order of compression;
a multiplexer configured to select the image data written to the memory for the boundary portion, and select image data which is restored by the decompressor for a portion other than the boundary portion; and
a timing controller configured to transmit the image data selected by the multiplexer to the display apparatus.

14. The apparatus of claim 13, wherein each of the regions includes a plurality of lines that form an image to be displayed on the display apparatus.

15. The apparatus of claim 13, wherein
the receiver receives control information indicative of a first numbers of lines in each of the regions and a second number of lines in the boundary portion, and
the multiplexer selects the image data based on the control information.

16. An image display system comprising:
a display apparatus;
a host processor configured to supply image data which forms an image to be displayed on the display apparatus; and
an image processing apparatus configured to transmit the image data to the display apparatus,
wherein the image processing apparatus comprises:
a receiver configured to receive the image data;
a write controller configured to control to divide the image data into a plurality of regions and write compressed image data obtained by compressing the image data for each region, to a frame memory; and a transmission controller configured to control to transmit, to the display apparatus, original image data, which is restored by reading the compressed image data from the frame memory and decompressing the compressed image data for each region, wherein each of the regions comprises an overlap portion which is overlapped by a part of an adjacent region, the overlap portion being used for compression and decompression of the image data at a boundary of adjacent two regions, and the transmission controller controls to transmit, to the display apparatus, a first region from which the image data of the overlap portion is removed, the first region being compressed later than a second region, the first region being adjacent to the second region, each of the first region and the second region being one of the plurality of regions.

17. The system of claim 16, wherein the receiver receives the image data of the overlap portion redundantly.

18. The system of claim 16, wherein the write controller comprises:

a plurality of compressors configured to compress the image data for each region to generate the compressed image data, and a memory controller configured to write the compressed image data generated by the plurality of compressors to the frame memory.

19. The system of claim 16, wherein each of the regions comprises a plurality of lines that form an image to be displayed on the display apparatus.

20. The system of claim 16, wherein when the receiver receives rewriting region information indicative of one of the plurality of regions and the image data of a region indicated by the rewriting region information, the write controller generates compressed image data by compressing the image data in the region received by the receiver, and rewrites compressed image data, which is written to the frame memory, of the region indicated by the rewriting region information.

* * * * *